(12) United States Patent
Cho et al.

(10) Patent No.: US 10,640,100 B2
(45) Date of Patent: May 5, 2020

(54) METHOD FOR CONTROLLING CLUTCH OF VEHICLE WITH AUTOMATED MANUAL TRANSMISSION

(71) Applicants: HYUNDAI MOTOR COMPANY, Seoul (KR); KIA MOTORS CORPORATION, Seoul (KR)

(72) Inventors: Sung Hyun Cho, Yongin-si (KR); Seong Hwan Cheong, Suwon-si (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 264 days.

(21) Appl. No.: 15/827,534

(22) Filed: Nov. 30, 2017

(65) Prior Publication Data

US 2019/0092311 A1    Mar. 28, 2019

(30) Foreign Application Priority Data

Sep. 25, 2017   (KR) ........................ 10-2017-0123669

(51) Int. Cl.
*B60W 10/02* (2006.01)
*B60W 10/11* (2012.01)
*B60W 30/19* (2012.01)

(52) U.S. Cl.
CPC ............ *B60W 10/02* (2013.01); *B60W 30/19* (2013.01); *B60W 2510/0208* (2013.01); *B60W 2510/0241* (2013.01); *B60W 2510/0275* (2013.01); *B60W 2510/0657* (2013.01); *F16D 2500/1083* (2013.01)

(58) Field of Classification Search
CPC ...... B60W 10/02; B60W 10/11; B60W 30/19; B60W 2510/0275; B60W 2510/0657; F16D 48/06; F16D 48/08; F16D 2500/1083; F16D 2500/5012; F16D 2500/5018; F16D 2500/5023; F16D 2500/50233; F16D 2500/50281
See application file for complete search history.

(56) References Cited

U.S. PATENT DOCUMENTS 4,899,857 A * 2/1990 Tateno ................. B60W 10/02
                                                    477/73
6,086,514 A * 7/2000 Jones .................... B60W 10/02
                                                    477/180

(Continued)

FOREIGN PATENT DOCUMENTS

| JP | 4375796 B2 | 12/2009 |
| KR | 10-1393872 B1 | 5/2014 |
| KR | 10-1694018 B1 | 1/2017 |

*Primary Examiner* — Edwin A Young
(74) *Attorney, Agent, or Firm* — Brinks Gilson & Lione

(57) ABSTRACT

The present disclosure relates to a technique for improving durability of a clutch and shifting stability. The present disclosure provides a method of controlling a clutch of an automated manual transmission (AMT) vehicle, which reduces a micro-slip control time in order to improve durability of the clutch by performing a full-lock control of the clutch after slip control for learning a clutch characteristic curve. Additionally, the method shortens time to open the clutch for a subsequent shifting by predicting the time when a shift restarts after the full-lock control and by resuming the micro-slip control.

5 Claims, 4 Drawing Sheets

(56) References Cited

U.S. PATENT DOCUMENTS

| | | | | |
|---|---|---|---|---|
| 8,936,530 B2* | 1/2015 | Redbrandt | ............ | B60W 10/02 477/78 |
| 2011/0306463 A1* | 12/2011 | Tamba | ................ | B60K 6/105 477/5 |

* cited by examiner

METHOD FOR CONTROLLING CLUTCH OF VEHICLE WITH AUTOMATED MANUAL TRANSMISSION

CROSS REFERENCE TO RELATED APPLICATION

The present application claims priority to and the benefit of Korean Patent Application No. 10-2017-0123669, filed on Sep. 25, 2017, which is incorporated herein by reference in its entirety.

FIELD

The present disclosure relates to a method of controlling a clutch of a vehicle equipped with an automated manual transmission (AMT), which appropriately controls the timing of a micro-slip control and a full-lock control of a clutch when the vehicle is moving.

BACKGROUND

The statements in this section merely provide background information related to the present disclosure and may not constitute prior art.

The AMT system directly connects an engine and a clutch in order to improve a fuel efficiency and a power transmission efficiency, but on the other hand, the AMT system has no damping factor so that a jolt or clutch slip may occur depending on a torque change. Therefore, an algorithm for predicting the transmission torque characteristics of a clutch in real time may be desired.

Thus, conventionally, the transmission torque characteristics of a clutch were predicted using a torque-stroke curve (T-S curve) of a dry clutch. Here, the T-S curve is obtained by converting, into data, the transmission torque characteristics of a dry clutch depending on a stroke of a clutch actuator.

Meanwhile, unlike a dual clutch transmission (DCT), the automated manual transmission (AMT) has the same system characteristic as a typical manual transmission. That is, the AMT is configured in a normally-closed type in which the clutch is normally in an engaged state, thereby transferring power of an engine.

In the structure of the AMT, if the micro-slip control is performed in order to learn a characteristic curve of clutch transmission torque in the same manner as the DCT, a constant load is applied to a clutch diaphragm spring and a release bearing, which may cause hardware problems of the transmission such as deterioration of durability thereof.

The description of the technical background above has been made merely for the purpose of helping understanding the background of the present disclosure, and it should not be taken as an admission that the description belongs to the prior art known to those skilled in the art.

SUMMARY

The present disclosure provides a method of controlling a clutch of an AMT vehicle, which appropriately controls the timing of a micro-slip control and a full-lock control of a clutch when the vehicle is moving to improve durability of a clutch.

A method of controlling a clutch of an AMT vehicle, in some forms of the present disclosure, may include: when a shift to current stage completes during an operation of the AMT vehicle, performing, with a controller, a micro-slip control of a clutch to learn clutch transmission torque characteristics; when a slip releasing condition is satisfied based on the clutch transmission torque characteristics, performing, with the controller, a full-lock control of the clutch; and when it is determined that a shift from the current stage to a target stage is required based on driving conditions including driving state of the AMT vehicle, performing, with the controller, the micro-slip control of the clutch until a shift to the target stage starts.

In performing the full-lock control of the clutch, determining that the slip releasing condition may be satisfied when an absolute value of a difference between an engine torque and a clutch torque is maintained below a reference value for a predetermined amount of time and when an absolute value of an amount of slip of the clutch is maintained below a reference value for a predetermined amount of time.

Performing the full-lock control of the clutch may include: controlling, with a clutch actuator, the clutch torque such that the clutch torque rises to maximum transmission torque on a clutch characteristic curve; and turning off the clutch actuator when the clutch torque reaches the maximum transmission torque.

Performing the micro-slip control of the clutch until the shift to the target stage starts may further include turning on the clutch actuator to perform the micro-slip control of the clutch after the clutch actuator is turned off when the clutch torque reaches the maximum transmission torque.

Performing the micro-slip control of the clutch until the shift to the target stage starts may further include, determining that a shift from the current stage to the target stage is required when an offset vehicle speed value predicted depending on an increasing or a reduction in the current vehicle speed is equal to or greater than a speed difference value that is calculated based on a difference between the current vehicle speed and a shifted vehicle speed.

Performing the micro-slip control of the clutch until the shift to the target stage starts may further include, performing the micro-slip control of the clutch when an input shaft rotational speed is lower than a stall-prevention speed that is calculated by adding a predetermined speed value to a predetermined engine idling speed.

The present disclosure may contribute to reducing a micro-slip control time when a vehicle is moving in order to improve durability of a clutch by performing a full-lock control of a clutch when learning about a characteristic curve of the clutch completes during the slip control process of a clutch. Further, the present disclosure may contribute to reducing the shifting control time because the time taken for opening the clutch for a next shift can be shortened by predicting the time when a shift restarts after the full-lock control and by resuming the micro-slip control.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
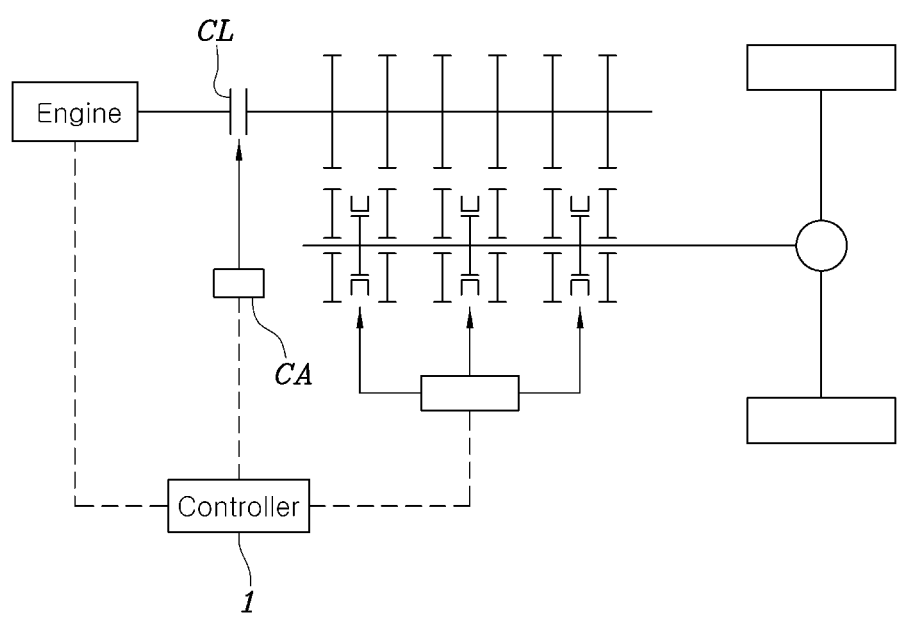
FIG. 1 is a view illustrating an example of a power train structure of an AMT vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A method of controlling a clutch of an AMT vehicle, in some forms of the present disclosure, may be configured to include a first slip control step, a full-lock control step, and a second slip control step.

The present disclosure will be described in detail with reference to FIG. 1. First, in the first slip control step, when shifting to the current stage is completed while a vehicle is moving, a controller 1 may perform micro-slip control of a clutch (CL) in order to thereby learn the transmission torque characteristics of a clutch.

For example, in order to learn the transmission torque characteristics of a clutch, the clutch (CL) is controlled so as to slightly slip. The micro-slip control of the clutch (CL) is performed such that a clutch speed and an engine speed are controlled to maintain a micro-slip by lowering target torque of the clutch when the vehicle is moving while a transmission gear is engaged.

In other words, since the angular speed of the engine is constant in the micro-slip state, the rotational inertia of the engine does not need to be considered. Thus, the engine torque becomes physically equal to the clutch torque, and as a result, the T-S curve can be obtained through the micro-slip control using the engine torque and the stroke of the clutch actuator.

That is, drivability and controllability of the transmission can be ensured by predicting the characteristics of a dry clutch by performing the micro-slip control at all times because the characteristics of a dry clutch vary in real time.

Subsequently, in the full-lock control step, the controller 1 may perform full-lock control of the clutch (CL) when a slip releasing condition is satisfied in the course of learning the clutch characteristics.

For example, the full-lock control of the clutch (CL) may be conducted by performing control such that the clutch torque rises up to the maximum transmission torque on the clutch characteristic curve through the operation of the clutch actuator (CA).

Here, the slip releasing condition may be determined to be satisfied if an absolute value of the difference between the engine torque and the clutch torque is maintained below a reference value for a predetermined amount of time and if an absolute value of the amount of slip of the clutch (CL) is maintained below a reference value for a predetermined amount of time, and then, the process may be controlled so as to enter the full-lock control of the clutch (CL).

In the second slip control step, when it is determined that a shift from the current stage to a target stage is required based on driving conditions reflecting the driving state of the vehicle, the controller 1 may allow the micro-slip control of the clutch (CL) to be performed until the shift to the target stage is started.

As an example of the driving conditions for determining whether or not a shift from the current stage to a target stage is required, it may be determined that the shift from the current stage to a target stage is required if an offset vehicle speed value predicted depending on an increase or a reduction in the current vehicle speed is equal to or greater than a difference value between the current vehicle speed and a shifted vehicle speed on a shift pattern adjacent thereto.

Figure 4:
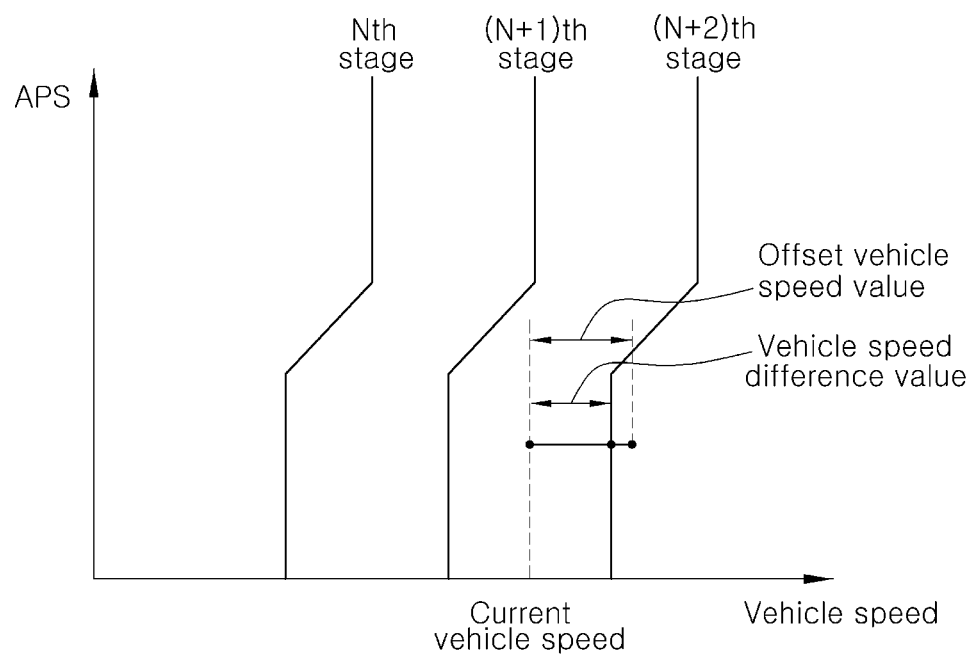
FIG. 4 is a view for explaining the principle of predicting a subsequent shift using a shift pattern and a vehicle speed.

That is, in the case where the vehicle is currently moving in the (N+1)th stage as shown in FIG. 4, it is possible to obtain a vehicle speed necessary for the shift to the (N+2)th stage through the shift pattern, and thus, a difference value (vehicle speed difference value) between the current vehicle speed and the vehicle speed upon the shifting to the (N+2)th stage can be obtained.

At the same time, when the vehicle is accelerated, it is possible to calculate and predict an offset vehicle speed value, which is the amount of change in the vehicle speed, depending on the acceleration of the vehicle.

Therefore, it may be predicted that the shifting to a target stage corresponding to a driving situation of the vehicle is required when a vehicle speed, which is obtained by adding the offset vehicle speed value to the current vehicle speed, is greater than a vehicle speed, which is obtained by adding the vehicle speed difference value to the current vehicle speed.

As described above, in some forms of the present disclosure, the micro-slip control of the clutch (CL) is performed from the time at which the actual shifting of the current driving stage is completed in order to thereby learn the transmission torque characteristic curve of the clutch, and when the learning about the transmission torque characteristic curve of the clutch is completed to some extent, control for fully closing the clutch (CL) is performed.

That is, a load application time with respect to a clutch diaphragm spring and a release bearing due to the operation of the clutch actuator (CA) can be shortened by reducing the micro-slip control time of the clutch (CL) through the full-lock control after the micro-slip control of the clutch (CL), thereby improving durability of the clutch (CL).

Further, the process is controlled so as to resume the micro-slip control by predicting the time at which the shifting is restarted after the full-lock control. Therefore, it is possible to shorten the time taken to open the clutch (CL) because the clutch torque is excessive at the time of subsequent shifting in order to thereby minimize the elongation of the transmission control, thereby achieving shifting stability.

Meanwhile, the full-lock control step may further include an off-operation step of turning off the clutch actuator (CA) when the clutch torque reaches the maximum transmission torque.

That is, when the clutch torque reaches the maximum transmission torque according to the control in which the clutch (CL) is moved in the direction for engagement by the operation of the clutch actuator (CA), the full-lock state of the clutch (CL) can be maintained by the elastic force of the diaphragm spring even without control of the clutch actuator (CA).

Therefore, the clutch actuator (CA) may not be operated when the vehicle is moving while the full-lock state of the clutch (CL) is maintained, thereby improving the fuel efficiency.

Of course, the second slip control step may further include an on-operation step of performing the micro-slip control of the clutch (CL) by turning on the clutch actuator (CA) to be operated after the off-operation step of the clutch actuator (CA).

That is, when the restart of the shifting is predicted, the micro-slip control of the clutch (CL) is required again. At this time, the micro-slip control of the clutch (CL) is performed by operating the clutch actuator (CA).

Meanwhile, in the second slip control step, the micro-slip control of the clutch (CL) may be performed when an input shaft rotational speed becomes lower than the stall-prevention speed, which is obtained by adding a predetermined speed value to a predetermined engine idling speed.

That is, if the driving force of an engine fails to overcome the load of the vehicle, an engine stall phenomenon, in which the engine comes to a standstill, may occur because the driving force of the engine is transmitted to the vehicle through the clutch (CL) while the clutch (CL) is engaged when the vehicle is moving. Therefore, when the input shaft rotational speed becomes lower than the predetermined stall-prevention speed, the slip control of the clutch (CL) may be performed, thereby preventing the occurrence of the engine stall phenomenon.

Figure 2:
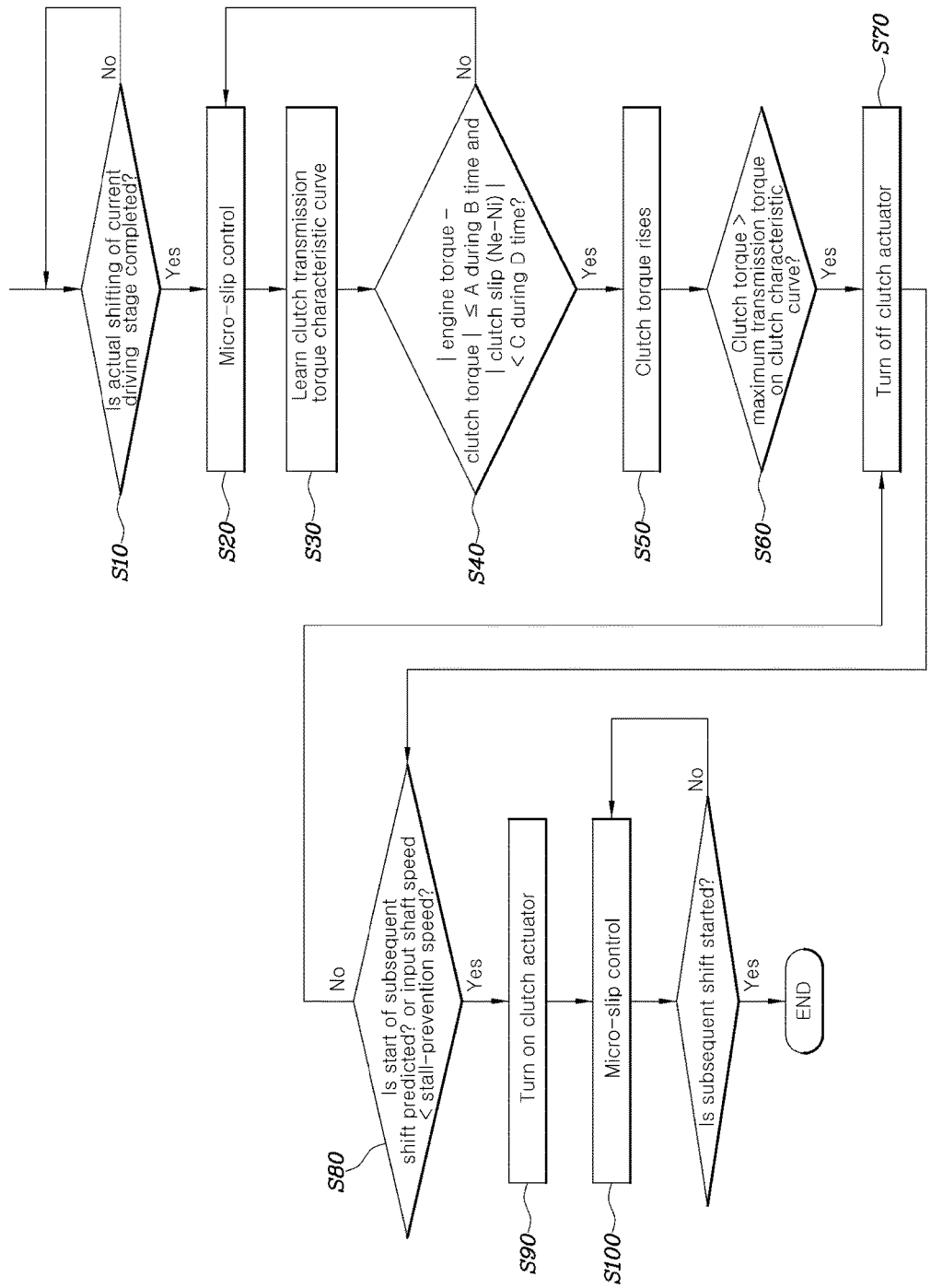
FIG. 2 is a flowchart illustrating a clutch control method.
Figure 3:
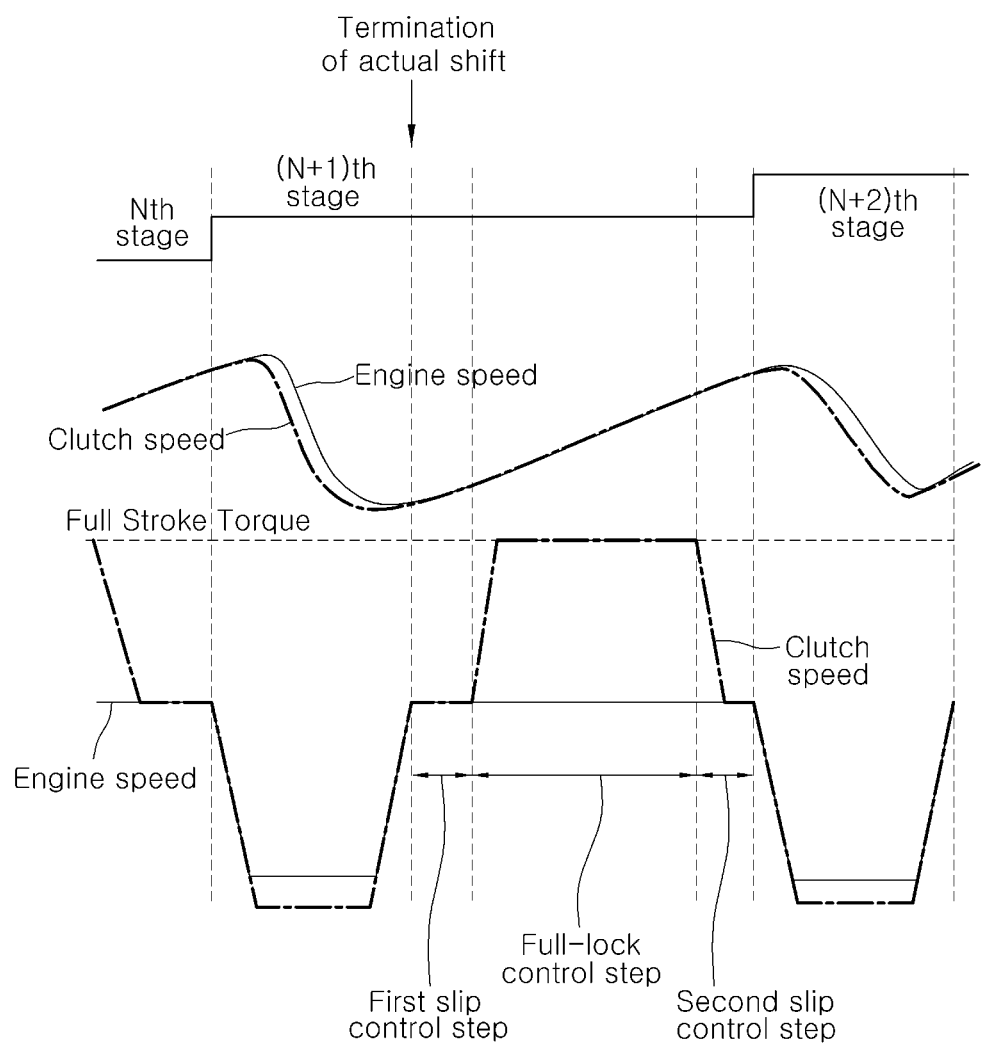
FIG. 3 is a view for explaining the behavior of an engine and a clutch for each period.

Referring to FIG. 2 illustrating a flowchart of clutch control of an AMT vehicle in some forms of the present disclosure, when the actual shifting to the (N+1)th stage is completed such that the current driving stage switches from the Nth stage to the (N+1)th stage (S10), the micro-slip control is performed from the time at which the actual shifting is completed while maintaining the amount of slip of the clutch (CL) at 10~30 RPMs (S20). In this state, the clutch transmission torque characteristic curve is learned for a predetermined amount of time (S30).

In the slip control process above, it is determined whether or not an absolute value of the difference between the engine torque and the clutch torque is maintained to be less than A for more than the B time, and whether or not an absolute value of the amount of slip of the clutch (CL) (engine speed−input shaft rotational speed) is maintained to be less than C for more than the D time (S40). If the above-described condition is satisfied as a result of the determination, the clutch torque is raised to perform the full-lock control of the clutch (CL) (S50).

Next, it is determined whether or not the clutch torque has reached the maximum transmission torque on the clutch characteristic curve according to the full-lock control of the clutch (CL) (S60), and if it is determined that the clutch torque has reached the maximum transmission torque as a result of the determination in step S60, the clutch actuator (CA) is turned off (S70).

Subsequently, it is determined whether or not the vehicle is currently in a driving state in which an up-shift from the (N+1)th stage to the (N+2)th stage or a down-shift from the (N+1)th stage to the Nth stage is required based on the shift patterns and vehicle speed information, which are stored in the vehicle (S80).

As a result of the determination in step S80, for example, when it is determined that the up-shift to the (N+2)th stage is required according to the acceleration of the vehicle, the clutch actuator (CA) is turned on to be operated (S90). Thereafter, the micro-slip control of clutch (CL) is performed until the shift to the (N+2)th stage is started (S100), thereby shortening the shifting time necessary for declutching when the shift to the (N+2)th stage is started.

As described above, the present disclosure may reduce a micro-slip control time while the vehicle is moving in order to thereby improve durability of the clutch (CL) by performing the full-lock control of the clutch (CL) when the learning about the characteristic curve of the clutch (CL) is completed to some extent during the slip control process of the clutch (CL).

In addition, the present disclosure may reduce the shifting control time because the time taken for opening the clutch (CL) at the time of subsequent shifting is shortened by predicting the time at which the shifting is restarted after the full-lock control and by performing control so as to resume the micro-slip control.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of controlling a clutch of an automated manual transmission (AMT) vehicle, the method comprising:
    when a shift to current stage completes during an operation of the AMT vehicle, performing, with a controller, a micro-slip control of a clutch to learn clutch transmission torque characteristics, wherein the micro-slip control is a slip control performed in a state where an amount of slip of the clutch is maintained to a predetermined level;
    when a slip releasing condition is satisfied based on the clutch transmission torque characteristics, performing, with the controller, a full-lock control of the clutch; and
    when it is determined that a shift from the current stage to a target stage is required based on driving conditions including driving state of the AMT vehicle, performing, with the controller, the micro-slip control of the clutch until a shift to the target stage starts,
    wherein performing the full-lock control of the clutch further comprises:
        determining that the slip releasing condition is satisfied when an absolute value of a difference between an engine torque and a clutch torque is maintained below a first reference value for a first predetermined amount of time, and when an absolute value of the amount of slip of the clutch is maintained below a second reference value for a second predetermined amount of time.

2. The method of claim 1, wherein performing the full-lock control of the clutch comprises:
    controlling, with a clutch actuator, the clutch torque such that the clutch torque rises to maximum transmission torque on a clutch characteristic curve; and
    turning off the clutch actuator when the clutch torque reaches the maximum transmission torque.

3. The method of claim 2, wherein performing the micro-slip control of the clutch until the shift to the target stage starts further comprises:
    turning on the clutch actuator to perform the micro-slip control of the clutch after the clutch actuator is turned off when the clutch torque reaches the maximum transmission torque.

4. The method of claim 1, wherein performing the micro-slip control of the clutch until the shift to the target stage starts further comprises:
    determining that a shift from the current stage to the target stage is required when an offset vehicle speed value is greater than or equal to a speed difference value, wherein the offset vehicle speed value is predicted based on an increase or a decrease of a current vehicle speed, and the speed difference value is calculated based on a difference between the current vehicle speed and a shifted vehicle speed.

5. The method of claim 1, wherein performing the micro-slip control of the clutch until the shift to the target stage starts further comprises:
 performing the micro-slip control of the clutch when an input shaft rotational speed is lower than a stall-prevention speed that is calculated by adding a predetermined speed value to a predetermined engine idling speed.

* * * * *